Oct. 14, 1941.    A. L. STONE    2,258,913
METHOD OF BUTT WELDING
Filed March 20, 1940    2 Sheets-Sheet 1

Inventor
Albert L. Stone.
Batcheler + Scantlebury
Attorneys

Oct. 14, 1941.  A. L. STONE  2,258,913
METHOD OF BUTT WELDING
Filed March 20, 1940  2 Sheets—Sheet 2
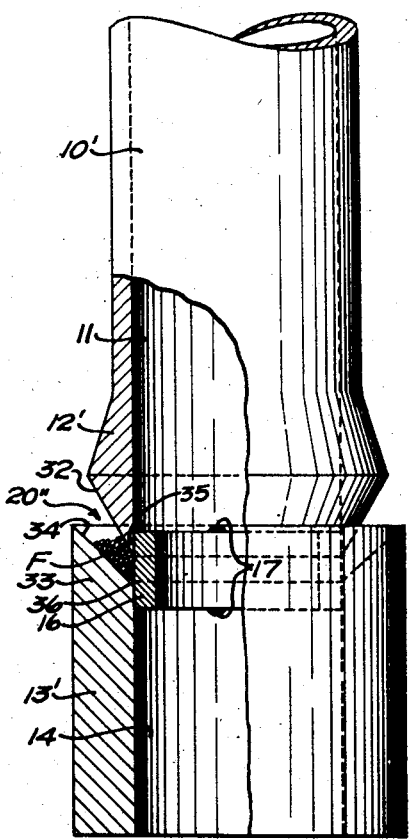
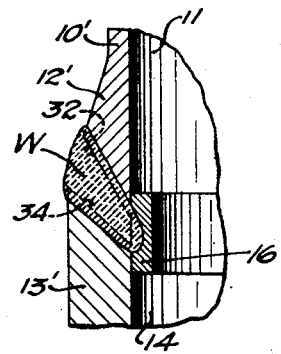
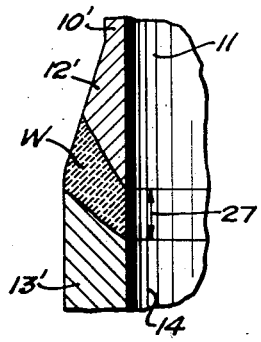
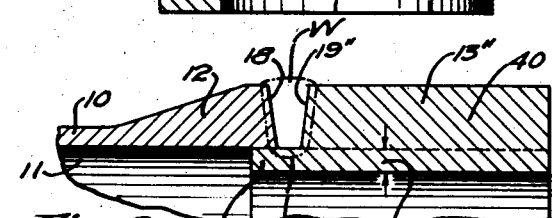
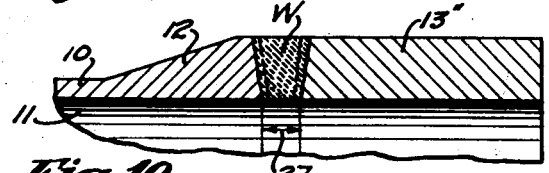
Inventor
Albert L. Stone.
Attorney.

Patented Oct. 14, 1941

2,258,913

UNITED STATES PATENT OFFICE 2,258,913

METHOD OF BUTT WELDING

Albert L. Stone, Palos Verdes Estates, Calif., assignor to Hydril Company, Los Angeles, Calif., a corporation of Nevada Application March 20, 1940, Serial No. 325,014

4 Claims. (Cl. 113—112)

This invention relates generally to an improved method of butt-welding and is more particularly concerned with methods for butt-welding tubular sections such as metal pipes or rings.

Generally, it is the object of the invention to provide a method whereby such a welding may be done expeditiously and with an insurance that the ultimate weld will be fully sound and of great strength.

While the invention may be utilized to advantage in any situation where tubular members are to be joined in end-to-end relation, it is applied with particular advantage in connection with the butt-welding of "stubs" to lengths of drill pipe. Therefore, without in any way limiting the invention, considered in its broader aspects, to this particular application, I will describe the same by reference to this particularized use.

So-called "upset" drill pipe has come into increasingly popular use. This pipe is upset at its ends to provide local areas of increased wall-thickness to take coupling threads. The need for and advantages of these upsets are well recognized and it will be unnecessary here to go into these phases. However, it also is well recognized that the upsetting of pipe is an expensive procedure and the greater the length of the upset, the greater the expense. Furthermore, manufacturing difficulties impose definite limits on the linear extent to which upsetting is feasible. Particularly in connection with certain forms of joints or couplings, the length of upset required is of such extent as to preclude the practicability of upsetting. In any event, the diminishment of the extent to which a pipe need be upset and yet enable the securement of the ultimate advantages of upsetting, is a well worthwhile objective.

Generally, I accomplish this by welding on to the end of a pipe, a section or "stub" of thick-walled tubular material. Though this is not limitative on the invention, the end of the pipe may be upset for a short distance so it will merge into the stub, but this relatively small extent of upsetting is easily and cheaply accomplished.

Further than this, the ends of drill pipe lengths must be provided with coupling threads and load-taking mating shoulders. Because of the nature of their duties, it is desirable that these ends be of relatively high grade alloys that are capable of withstanding critical loads and that may be heat-treated within critical ranges. Obviously, it would be economically prohibitive to make the entire pipe lengths of such alloys, it being understood that the loads taken by the central extents of such lengths do not impose the demands upon the structure that are imposed on the coupling extents.

However, by utilizing ordinary and relatively cheap drill-pipe stock for the lengths, proper, by confining the extents of higher grade alloys to the stubs or coupling ends, and then butt-welding the two together, I keep the aggregate cost within an allowable range and yet have the advantage of high-grade alloy coupling ends. This expedient also allows me to heat-treat the stubs in the manner best suited to the purpose, before they have been affixed to the pipe, thus avoiding the complications incident to localized heat treatment of a long, integral piece of stock.

It will be realized that drill pipe is exposed to extremely severe stresses and strains of tension and torque and, naturally, the welds between the pipe and the stubs are exposed to these stresses and strains. It follows that the weld must be so accomplished that, when finished, it does not represent a weaker zone. My method is such that a solid, strong weld is accomplished, leaving no cracks or weakened extents from which ruptures may later develop.

How I accomplish this will be better understood from the following detailed description, wherein further objects and features of novelty will be made apparent. Reference will be made to the accompanying drawings, in which:

Fig. 6 is an elevation, partly in broken-away section, illustrating a different pre-formation of the tubular elements preparatory to accomplishing the weld;

Fig. 7 is a fragmentary section showing the weld as accomplished in the set-up of Fig. 6;

Fig. 8 is a fragmentary section illustrating the welded joint, as started in Fig. 6, in completed form;

Fig. 9 is a fragmentary section illustrating another variation in a preparatory step; and Fig. 10 is a view similar to Fig. 9 but showing the joint of Fig. 9 in finished condition.

As stated above, the invention is directed broadly to the butt-welding of axially alined tubular members. It therefore broadly contemplates welding such members irrespective of their relative wall-thicknesses of their particular metallurgical characteristics, and of the duty to which the welded article is to be put. Therefore, the fact that I ascribe particularities to these thicknesses, characteristics and duties because they lend themselves particularly well for illustrative purposes and are particularly efficient embodiments of the invention, is not to be construed as limiting the invention thereto, except as to such claims as specifically set them forth.

Figure 1:
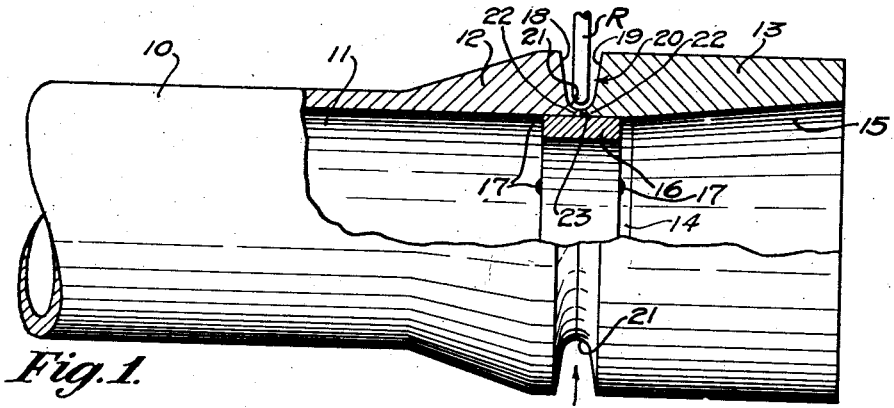
Fig. 1 is an elevation, partly in broken-away section, illustrating one step in carrying out my invention as applied to butt-welding two tubular sections.

In Fig. 1 I have illustrated a fragmentary section 10 of usual drill-pipe having a uniform-diameter bore 11, the end of the pipe having an externally upset terminal 12. The pipe may be made, for instance, of carbon steel with some manganese content. A tubular "stub" 13, preferably, though not necessarily, of tool joint stock made, for instance, of a steel-nickel-chromium alloy, has the same external diameter as the free end of upset 12. Stub 13 has a bore-portion 14 of the same diameter as bore 11 and, while this is not essential, its bore-portion 15 may flare outwardly from portion 14 to give the conical characteristics shown. If desired, stub 13 may be given specific heat treatment prior to its weld-attachment to or integration with pipe 10.

Pipe 10 and stub 13 are brought into axial alinement and end-contact, and a thick back-up ring 16, preferably, though not necessarily, of low carbon steel and cut, for instance, from Shelby tubing, is tightly fitted into bores 11 and 14 across the junction of the pipe and stub. Preferably the ring is press-fitted and the bores are turned smooth where they are to receive the ring, so there may be no gas voids between the elements during the subsequent welding operation. The ring thus holds the pipe and stub in coaxial relation and against relative movement in any direction, though, if desired, the ring may be tack-welded at 17 to the opposed members.

Either before or after the ring is applied, the opposed ends 18 and 19 of the pipe and stub, respectively, are cut back to give the effect shown in Fig. 1. That is, they are cut to define the annular groove 20 which is substantially U-shaped in cross section, though the side walls 18 and 19 preferably flare outwardly somewhat. The rounded bottom 21 of the groove defines the outer face of relatively thin lips 22 which meet at 23. Thus, lips 22 may be considered as having upper concave faces.

The ring is preferably of such width and is so located that it extends from each side of junction 23 a distance approximately equal to the width of groove 20 at its widest part.

The pipe, stub and ring assembly is then slowly rotated about a horizontal axis and the weld material deposited within the groove by any suitable hand or automatic process. In Fig. 1, I have conventionally illustrated a weld rod R serving as an electrode in carrying out an electric welding process.

Figure 4:
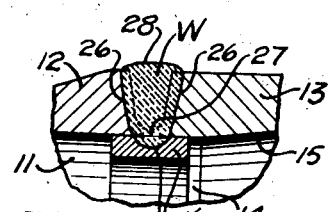
Fig. 4 is a fragmentary section showing another step in carrying out the invention.

Whatever the particular type of welding used, (and since these types are well understood they need not be discussed here, nor, for the same reason, need I discuss the application of flux during the operation) the weld material W first applied in groove 20 is caused to penetrate lips 22 and definitely to penetrate ring 16 an appreciable distance (Fig. 4). The weld material W is then applied in a manner to fill groove 20 and, of course, to penetrate the end walls 18 and 19, so the pipe, stub, and ring are solidly well-integrated.

The back-up ring prevents the weld from breaking through lips 22 into the pipe bore. Without this back-up ring the free points of the lips would merely burn off and the weld then pour through the crack thus opened, with the result that the weld would almost surely fail to penetrate laterally into the pipe and stub at points near their inner peripheries.

However, as shown in Fig. 4, by following my method, the weld W is caused to penetrate relatively deeply into ring 16 at 25, and since it also spreads laterally beyond ends 18 and 19 as at 26, the weld at the inner peripheries of the pipe and stub has considerable longitudinal extent 27. Thus, the crack initially presented at the point of lip-abutment 23, has been entirely eliminated and there is a solid weld of ample longitudinal extent from inside to outside of the composite pipe and stub.

Figure 5:
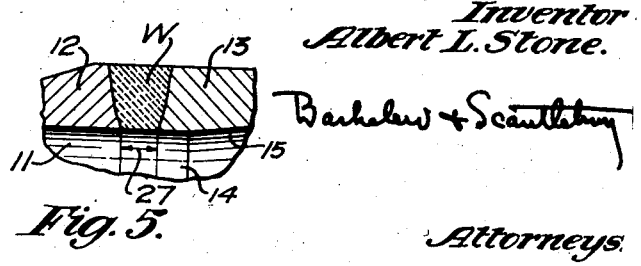
Fig. 5 is a fragmentary section showing the welded joint as completed.

Weld material W is usually applied so there is presented a crown 28, but this crown is ordinarily later turned off to give the finished exterior effect shown in Fig. 5. Also, as a finishing operation, ring 16 is cut away to give the final smooth-bore effect from pipe through stub, as shown in Fig. 5. It will be seen that the interiorly exposed extent 27 of the weld material presents an unbroken bond from pipe to stub.

Figure 2:
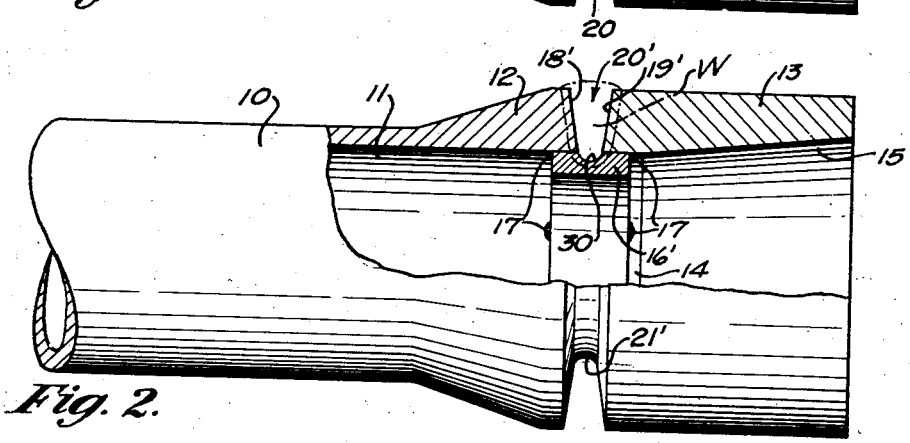
Fig. 2 is a fragmentary section showing a variation in such a preparatory step.
Figure 3:
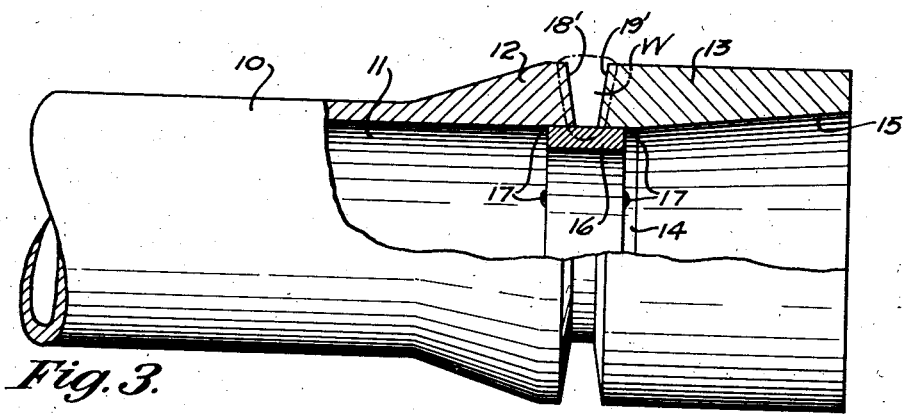
Fig. 3 is a fragmentary section showing a further variation in such a preparatory step.

Variationally, I may proceed as in Figs. 2 or 3. In Fig. 2 a groove 30 of arcuate cross section is cut in ring 16' to form the bottom 21' of flaring groove 20', the end walls 18' and 19' of pipe-upset 12 and stub 13 here being spaced apart throughout their entire extents. Groove 30 may be cut either before or after the ring has been applied to the pipe and stub. The weld material W will be applied as previously described, and while it does not have to penetrate through lips such as 22, it preferably will penetrate ring 16' to a point beneath the original bottom of groove 30. Weld W is indicated in dot-dash lines in Fig. 2 and the joint is finally finished up so it has the appearance and all the advantages of Fig. 5.

Or, as in Fig. 3, the end walls 18' and 19' may be fashioned and spaced as in Fig. 2 to give a flaring groove, while ring 16 is ungrooved as in Fig. 1. The weld material may be applied as previously described and as indicated in dot-dash lines, it being noted that it has been caused to penetrate ring 16 to an appreciable depth. The joint is then finished off in the manner described for the other joints, giving the same final effect as Fig. 5.

In Figs. 6, 7 and 8, I have shown a variation wherein the welding is accomplished while the pipe and stub members are supported in coaxial and substantially vertical positions. In this case the upset 12' of pipe 10' is formed to have a downwardly pointing conical end or shoulder 32, while the upper end 33 of stub 13' has an outwardly and upwardly inclining conical face or shoulder 34. The angle of shoulder 32 is preferably somewhat steeper than the angle of shoulder 34, thus giving the effect of a flaring mouth to groove 20". Back-up ring 16 is applied as previously described, spacing inner ends 35 and 36 of pipe 10' and stub 13', respectively, so groove 20" extends clear to ring 16.

With groove 20" thus disposed, it will be seen that it represents an annular, undercut pocket or cup into which flux F may be poured, and, as the weld material is applied, the shoulder 34 acts as a retainer wall to prevent spillage of that material until the groove is almost entirely filled. Groove 20″ may thus be described as an annular pocket inclining inwardly and downwardly from the outer periphery to the inner periphery of the unwelded assembly of pipe and stub.

The application of the weld material W will fundamentally be the same as previously described, that is, the weld material will be caused to penetrate ring 16 as well as shoulders 32 and 34, giving the effect of Fig. 7. Thereafter the joint will be finished off as previously described for the other joints, giving it the appearance of Fig. 8, and giving the beneficial results ascribed to the other joints.

Of course, the form of ring shown in Fig. 2 may be substituted for the form shown in Fig. 6; or the lips 22 shown in Fig. 1 may be embodied in the end-formations illustrated in Fig. 6.

Generally, it is also to be noted that while, in my claims, I have found it desirable for purposes of clarity to place the step of preparing the opposed ends of the tubular members prior to their being placed in alinement and prior to the placement of the back-up ring, it is obvious that these steps may be reversed in order and that the claims are therefore to be considered as including such reversals.

In Fig. 9 I have shown a variation in which the element corresponding to separate back-up ring 16 or 16′ in the other figures, is an integral part of one of the members to be joined, though this back-up element is later cut away just as in the previous cases.

Pipe 10, its upset 12 and its end wall 18 may be fashioned as are corresponding parts of any of the preceding figures. However, in this case the wall 40 of stub 13″ is increased in thickness by an amount approximately equal to the thickness of a ring 16. End shoulder 19″ is then cut back to leave an annular neck or ring-portion 16a projecting endwise from the stub, proper, which ring-portion is tightly fitted into pipe bore 11 and serves the same functions as the previously described back-up rings.

Weld material W is deposited as previously described, it first being caused to penetrate an appreciable extent into ring portion 16a as at 25a and into walls 18 and 19″ as indicated in dot-dash lines in Fig. 9. The joint is then finished to give the appearance of Fig. 10, the sub-stock being cut away throughout ring-portion 16a and, if desired, throughout the stock 41 which is in axial alinement with that portion.

While I have shown and described preferred embodiments of my invention, it will be understood various changes may be made without departing from the spirit and scope of the appended claims.

I claim:

1. The method of forming an internally-flush, butt-weld between a pair of tubular members, that includes arranging said members in axial alinement with their opposed ends having portions, at least longitudinally spaced to form an outwardly opening, annular welding groove, applying a tightly fitting metal ring to the inner peripheral walls of the members and extending from member to member, depositing weld material in the bottom of said groove and causing it to penetrate said ring, filling the groove with weld material to weld-integrate the ends of the two members to one another and to said ring, and cutting said ring with its weld-material-content from the bores of the now weld-integrated members.

2. The method of forming an internally flush butt-weld between a pair of tubular members, that includes preparing their opposed ends so, when they are arranged in axial opposition, there is formed an annular welding groove extending nearly to but stopping short of their inner peripheral walls to provide relatively thin lips defining the bottom wall of the groove, arranging said members in axial alinement with the lips in end engagement, applying a tightly fitting metal ring to the inner peripheral walls of the members and extending from member to member beneath and beyond the lips, depositing weld material in the bottom of said groove and causing it to penetrate said lips and to penetrate said ring to an appreciable depth, filling the groove with weld material to weld-integrate the ends of the two members to one another and to said ring, and cutting said ring with its weld-material-content from the bores of the now weld-integrated members.

3. The method of forming an internally flush, butt-weld between a pair of tubular members, that includes preparing their opposed ends so, when they are arranged vertically in axial opposition, there is formed an annular welding groove whose bottom wall inclines inwardly and downwardly from their outer peripheries, arranging said members vertically in axial opposition, applying a tightly fitting metal ring to the inner peripheral walls of the members and extending from member to member, depositing weld material in the bottom of said groove and causing it to penetrate said ring, filling the groove with weld material to weld-integrate the ends of the two members to one another and to said ring, and cutting said ring with its weld-material-content from the bores of the now weld-integrated members.

4. The method of forming an internally flush, butt-weld between a pair of tubular members, that includes arranging said members in axial alinement with their opposed ends having portions, at least, longitudinally spaced to form an outwardly opening, annular welding groove, extending an integral annulus of metal from one member into tight peripheral engagement with the inner peripheral wall of the other member so said annulus has a portion in radial alinement with said groove, depositing weld material in the bottom of said groove and causing it to penetrate said annulus, filling the groove with weld material to weld-integrate the ends of the two members to one another and to said annulus, and cutting away said annulus with its weld-material content.

ALBERT L. STONE.